United States Patent
Grenn

(10) Patent No.: US 9,830,751 B2
(45) Date of Patent: Nov. 28, 2017

(54) SYSTEM AND METHOD FOR CLEARING A READINESS BIT WHEN A CONTROL MODULE OF A VEHICLE IS REPROGRAMMED

(71) Applicant: GM Global Technology Operations LLC, Detroit, MI (US)

(72) Inventor: Daniel P. Grenn, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/007,386

(22) Filed: Jan. 27, 2016

(65) Prior Publication Data

US 2017/0213398 A1   Jul. 27, 2017

(51) Int. Cl.
*G07C 5/08* (2006.01)
*H04L 29/08* (2006.01)
*G05B 15/02* (2006.01)

(52) U.S. Cl.
CPC ........... *G07C 5/0808* (2013.01); *G05B 15/02* (2013.01); *G07C 5/085* (2013.01); *G07C 5/0816* (2013.01); *H04L 67/12* (2013.01)

(58) Field of Classification Search
CPC .... G07C 5/0808; G07C 5/0816; G07C 5/085; G05B 15/02; H04L 67/12; G01M 17/00
See application file for complete search history.

(56) References Cited

U.S. PATENT DOCUMENTS

2008/0204191 A1* 8/2008 Alrabady ............... H04L 12/66
340/5.21
2012/0060469 A1* 3/2012 Gady ...................... F01N 3/208
60/273

* cited by examiner

*Primary Examiner* — Mussa A Shaawat
*Assistant Examiner* — Michael Kerrigan

(57) ABSTRACT

A system according to the principles of the present disclosure includes a first reprogramming identification module and a first diagnostic module. The first reprogramming identification module identifies when a first control module of a vehicle is reprogrammed. The first diagnostic module sets a first diagnostic trouble code (DTC) when the first control module is reprogrammed and selectively clears the first DTC when an instruction to clear a second DTC stored in a second control module of the vehicle is received.

23 Claims, 3 Drawing Sheets

SYSTEM AND METHOD FOR CLEARING A READINESS BIT WHEN A CONTROL MODULE OF A VEHICLE IS REPROGRAMMED

FIELD

The present disclosure relates to vehicle control modules, and more particularly, to systems and methods for clearing a readiness bit when a control module of a vehicle is reprogrammed.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle control module typically stores one or more readiness bits, which indicate whether a vehicle diagnostic test has been performed. For example, a readiness bit may reflect a zero when a corresponding vehicle diagnostic test has not been performed and reflect a one when the vehicle diagnostic test has been performed. Vehicle control modules typically only store readiness bits for certain vehicle diagnostic tests such as those that monitor engine misfire, catalyst performance, and exhaust gas recirculation.

Readiness bits may be cleared after a vehicle component or subsystem is repaired to ensure that the vehicle component or subsystem is functioning properly. When a readiness bit is cleared, the readiness bit indicates that the corresponding vehicle diagnostic test has not been performed. Thus, clearing the readiness bit may involve switching the readiness bit from a one to a zero.

SUMMARY

A system according to the principles of the present disclosure includes a first reprogramming identification module and a first diagnostic module. The first reprogramming identification module identifies when a first control module of a vehicle is reprogrammed. The first diagnostic module sets a first diagnostic trouble code (DTC) when the first control module is reprogrammed and selectively clears the first DTC when an instruction to clear a second DTC stored in a second control module of the vehicle is received.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
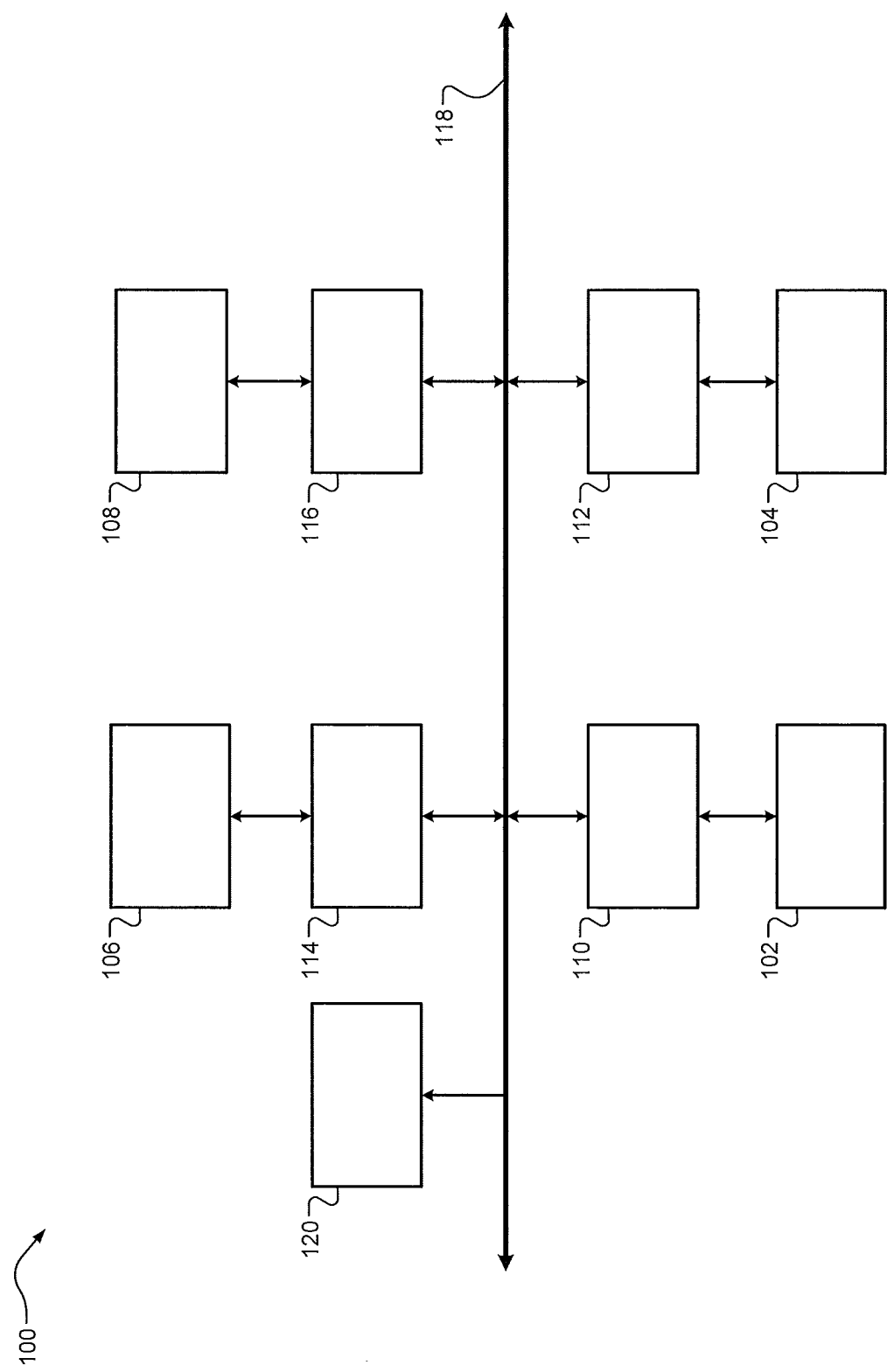
FIG. 1 is a functional block diagram of an example vehicle system according to the principles of the present disclosure.

A control module of a vehicle typically sets a diagnostic trouble code (DTC) when a component or subsystem of the vehicle experiences a fault. The fault may be identified when a component or subsystem fails a diagnostic test. In addition to setting a DTC, the control module may activate a service indicator when a component or subsystem of the vehicle experiences a fault. As discussed above, readiness bits may be used to determine whether certain vehicle diagnostic tests have been performed. Thus, if a readiness bit indicates that a vehicle diagnostic test has been performed and the service indicator is not activated, one may assume that the component or system evaluated by the vehicle diagnostic test is functioning properly.

Once a control module sets a DTC and activates a service indicator, the DTC may be stored in the control module and the service indicator may be activated until the conditions associated with the fault are no longer present. Alternatively, the DTC may be erased from the control module and the service indicator may be deactivated by reflashing the control module. In addition, reflashing a control module may clear all readiness bits stored in the control module.

When one control module of a vehicle sets a DTC indicating a fault in a component or subsystem, other control modules of the vehicle may disable vehicle diagnostic tests that evaluate other related components or subsystems in order to prevent a DTC from being set erroneously. For example, a transmission control module (TCM) may execute a vehicle diagnostic test that evaluates a vehicle speed sensor, and an engine control module (ECM) may execute vehicle diagnostic tests that use the measured vehicle speed provided by the vehicle speed sensor. Thus, if the TCM identifies a fault in the vehicle speed, the ECM may disable its diagnostic tests that use the measured vehicle speed.

In some instances, the control module that set the DTC may be reflashed without repairing the component or subsystem. In turn, the service indicator may be deactivated and all DTCs stored in the reflashed control module may be erased while the readiness bits stored in the other control modules may still indicate that vehicle diagnostic tests have been performed. Thus, if the vehicle is evaluated before the disabled vehicle diagnostic tests are performed, the faulty component or subsystem may appear to be functioning properly.

To avoid this issue, a system and method according to the present disclosure sets a first DTC and activates a service indicator when a control module of a vehicle is reprogrammed. The first DTC indicates that the control module has been reprogrammed and/or that a code clear is required. The system and method does not erase the DTC or deactivate the service indicator until the system and method receives a code clear instruction. In one example, the code clear instruction is an instruction to clear all DTCs in all control modules of the vehicle, and the code clear instruction is communicated to all of the control modules of the vehicle through a vehicle bus.

As indicated above, a control module of a vehicle may clear all readiness bits stored in the control module when the control module clears all DTCs stored in control module. Thus, by waiting for the receipt of the code clear instruction before clearing the first DTC or deactivating the service indicator, the system and method ensures that the service indicator remains activated until the readiness bits in all of the control modules of the vehicle are cleared. As a result, the system and method avoids the situation where a component or subsystem appears to be functioning properly after one control module of a vehicle is reflashed without resetting readiness bits in all other control modules of the vehicle.

Referring now to FIG. 1, a vehicle system 100 includes an engine 102, a transmission 104, an electronic limited slip differential (eLSD) 106, and trailer brakes 108. The vehicle system 100 also includes an engine control module (ECM) 110, a transmission control module (TCM) 112, an eLSD control module 114, and a trailer brake control module 116. The ECM 110 controls the engine 102, the TCM 112 controls the transmission 104, the eLSD control module 114 controls the eLSD 106, and the trailer brake control module 116 controls the trailer brakes 108. The ECM 110, the TCM 112, the eLSD control module 114, and the trailer brake control module 116 communicate with each other using a vehicle bus 118 such as a controller area network (CAN) bus.

The ECM 110, the TCM 112, the eLSD control module 114, and/or the trailer brake control module 116 may activate a service indicator 120 using, for example, the vehicle bus 118. The service indicator 120 delivers a visual message (e.g. text), an audible message, and/or a tactile message (e.g., vibration) indicating that the vehicle system 100 requires service. The service indicator 120 may be activated when a fault is detected in the vehicle system 100.

Figure 2:
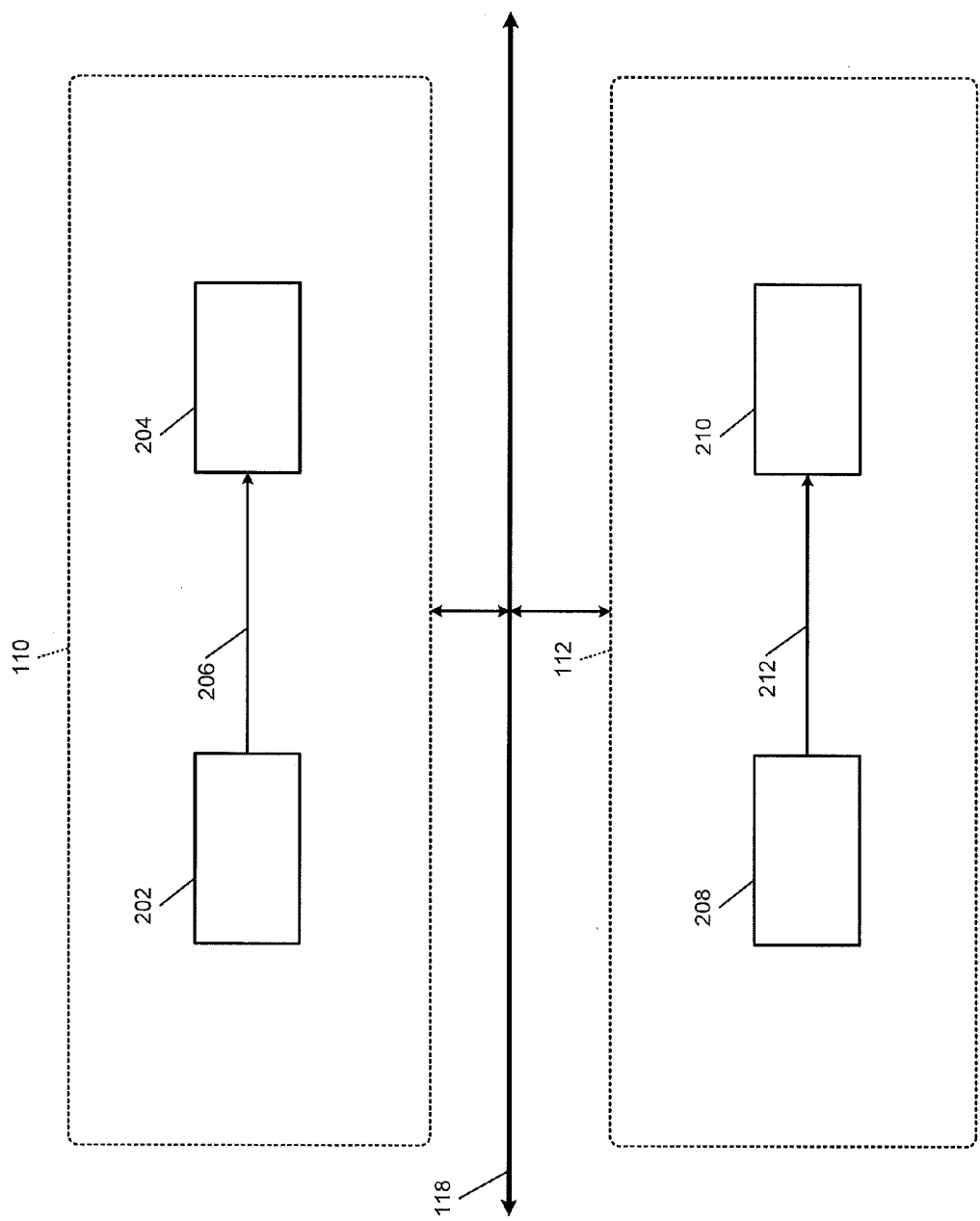
FIG. 2 is a functional block diagram of an example control system according to the principles of the present disclosure.

Referring now to FIG. 2, an example implementation of the ECM 110 includes a reprogramming identification module 202 and a diagnostic module 204. The reprogramming identification module 202 identifies when the ECM 110 is reprogrammed and generates a signal 206 indicating when the ECM 110 is reprogrammed. The reprogramming identification module 202 may identify that the ECM 110 has been reprogrammed when any software stored in the ECM 110 is changed. For example, the reprogramming identification module 202 may identify that the ECM 110 has been reprogrammed when the ECM 110 is reflashed, when the ECM 110 receives a software update, and/or when calibration values stored in the ECM 110 are changed. These software changes may be made by a technician using a handheld service tool that communicates with the ECM 110 through the vehicle bus 118.

The diagnostic module 204 sets a first diagnostic trouble code (DTC) when the diagnostic module 204 receives the signal 206 from the reprogramming identification module 202 indicating that the ECM 110 has been reprogrammed. The first DTC may indicate that the ECM 110 has been reprogrammed and/or that a code clear is required. The first DTC may include a pending DTC, a confirmed DTC, and a permanent DTC.

Pending DTCs are set when a subsystem or component of a vehicle recently failed a diagnostic test. Pending DTCs are automatically cleared when the subsystem or component pass the diagnostic test and an ignition switch of the vehicle is switched off. Confirmed DTCs are recorded or set when a service indicator is activated. Confirmed DTCs are cleared when a battery of a vehicle is disconnected, a code clear instruction is received, or the condition that caused the service indicator to be activated is not present or satisfied for a predetermined period (e.g., two weeks).

Permanent DTCs are set when a subsystem or component of a vehicle repeatedly fails a diagnostic test. Permanent DTCs are cleared when (i) the subsystem or component is repaired or a code clear instruction is received and (ii) the subsystem or component subsequently passes the diagnostic test. In addition, pending DTCs, confirmed DTCs, and permanent DTCs are cleared when a control modules storing the DTCs is reflashed.

The diagnostic module 204 may also activate the service indicator 120 when the diagnostic module 204 receives the signal 206 from the reprogramming identification module 202 indicating that the ECM 110 has been reprogrammed. When activated by the diagnostic module 204, the service indicator 120 may indicate that the ECM 110 has been reprogrammed and/or that a code clear is required. For example, the service indicator 120 may display the following text: "ECU Reprogrammed—Code Clear Required," where "ECU" stands for electronic control unit and may refer to a control module of the vehicle system 100 such as the ECM 110. Thus, the service indicator 120 may prompt a technician to clear all DTCs stored in one or more (e.g., all) control modules of the vehicle system 100.

After activating the service indicator 120, the diagnostic module 204 may determine whether a code clear instruction is received. A technician may generate the code clear instruction using a handheld service tool, and the code clear instruction may be communicated to all control modules of the vehicle system 100 through the vehicle bus 118. The code clear instruction may be an instruction to clear a second DTC stored in the TCM 112, an instruction to clear all DTCs stored in the TCM 112, and/or an instruction to clear all DTCs stored in all control modules of the vehicle system 100. It should be appreciated that the instruction to clear all DTCs stored in all control modules of the vehicle system 100 may include the instruction to clear all DTCs stored in the TCM 112 such as the second DTC.

When the diagnostic module 204 receives the code clear instruction, the diagnostic module 204 determines whether certain engine operating conditions satisfy predetermined criteria for a code clear. The engine operating conditions may satisfy the predetermined criteria when an ignition switch of the vehicle system 100 is switched to an on position and/or when the engine 102 is not running. The diagnostic module 204 may determine that the engine 102 is not running when the speed of the engine is less than or equal to a predetermined speed (e.g., zero).

When the diagnostic module 204 receives the code clear instruction and the engine operating conditions satisfy the predetermined criteria, the diagnostic module 204 clears the first DTC including any pending DTC, confirmed DTC, and permanent DTC that are included in the first DTC. In addition, the diagnostic module 204 may deactivate the service indicator 120. When deactivated, the service indicator 120 may no longer indicate that the ECM 110 has been reprogrammed and/or that a code clear is required.

When the TCM 112 receives the code clear instruction, the TCM 112 may clear all DTCs stored in the TCM 112. In addition, when clearing all DTCs stored in the TCM 112, the TCM 112 may clear all readiness bits stored in the TCM 112. A readiness bit indicates whether a vehicle diagnostic test has been performed. For example, a readiness bit may reflect a zero when a corresponding vehicle diagnostic test has not been performed and reflect a one when the vehicle diagnostic test has been performed. When a readiness bit is cleared, the readiness bit indicates that the corresponding vehicle diagnostic test has not been performed. Thus, clearing the readiness bit may involve switching the readiness bit from a one to a zero.

Referring still to FIG. 2, an example implementation of the TCM 112 includes a reprogramming identification module 208 and a diagnostic module 210. The reprogramming identification module 208 identifies when the TCM 112 is reprogrammed and generates a signal 212 indicating when the TCM 112 is reprogrammed. The reprogramming identification module 208 may identify that the TCM 112 has been reprogrammed when any software stored in the TCM 112 is changed. For example, the reprogramming identification module 208 may identify that the TCM 112 has been reprogrammed when the TCM 112 is reflashed, when the TCM 112 receives a software update, and/or when calibration values stored in the TCM 112 are changed. These software changes may be made by a technician using a handheld service tool that communicates with the TCM 112 through the vehicle bus 118.

The diagnostic module 210 sets a third diagnostic trouble code (DTC) when the diagnostic module 210 receives the signal 212 from the reprogramming identification module 208 indicating that the TCM 112 has been reprogrammed. The third DTC may indicate that the ECM 110 has been reprogrammed and/or that a code clear is required. The third DTC may include a pending DTC, a confirmed DTC, and a permanent DTC.

The diagnostic module 210 may also activate the service indicator 120 when the diagnostic module 210 receives the signal 212 from the reprogramming identification module 208 indicating that the TCM 112 has been reprogrammed. When activated by the diagnostic module 210, the service indicator 120 may indicate that the TCM 112 has been reprogrammed and/or that a code clear is required. For example, the service indicator 120 may display the following text: "TCM Reprogrammed—Code Clear Required." Thus, the service indicator 120 may prompt a technician to clear all DTCs stored in any control module of the vehicle system 100.

After activating the service indicator 120, the diagnostic module 210 may determine whether a code clear instruction is received. A technician may generate the code clear instruction using a handheld service tool,' and the code clear instruction may be communicated to all control modules of the vehicle system 100 through the vehicle bus 118. The code clear instruction may be an instruction to clear a fourth DTC stored in the ECM 110, an instruction to clear all DTCs stored in the ECM 110, and/or an instruction to clear all DTCs stored in all control modules of the vehicle system 100. It should be appreciated that the instruction to clear all DTCs stored in all control modules of the vehicle system 100 may include the instruction to clear all DTCs stored in the ECM 110 such as the fourth DTC.

When the diagnostic module 210 receives the code clear instruction, the diagnostic module 210 determines whether certain engine operating conditions satisfy predetermined criteria for a code clear. The engine operating conditions may satisfy the predetermined criteria when an ignition switch of the vehicle system 100 is switched to an on position and/or when the engine 102 is not running. The diagnostic module 204 may determine that the engine 102 is not running when the speed of the engine is less than or equal to a predetermined speed (e.g., zero).

When the diagnostic module 210 receives the code clear instruction and the engine operating conditions satisfy the predetermined criteria, the diagnostic module 210 clears the third DTC. In addition, the diagnostic module 210 may deactivate the service indicator 120. When deactivated, the service indicator 120 may no longer indicate that the TCM 112 has been reprogrammed and/or that a code clear is required.

When the ECM 110 receives the code clear instruction, the ECM 110 may clear all DTCs stored in the ECM 110. In addition, when clearing all DTCs stored in the ECM 110, the ECM 110 may clear all readiness bits stored in the ECM 110. As indicated above, the ECM 110 may clear all readiness bits stored in the ECM 110 by switching the readiness bits from ones to zeros.

Although FIG. 2 only shows the ECM 110 and the TCM 112, each of the control modules in the vehicle system 100 may include modules that function similar to the modules in the ECM 110 and the TCM 112. For example, the eLSD control module 114 and the trailer brake control module 116 may each include a reprogramming identification module and a diagnostic module similar to the reprogramming identification modules 202, 208 and the diagnostic modules 204, 210, respectively.

Figure 3:
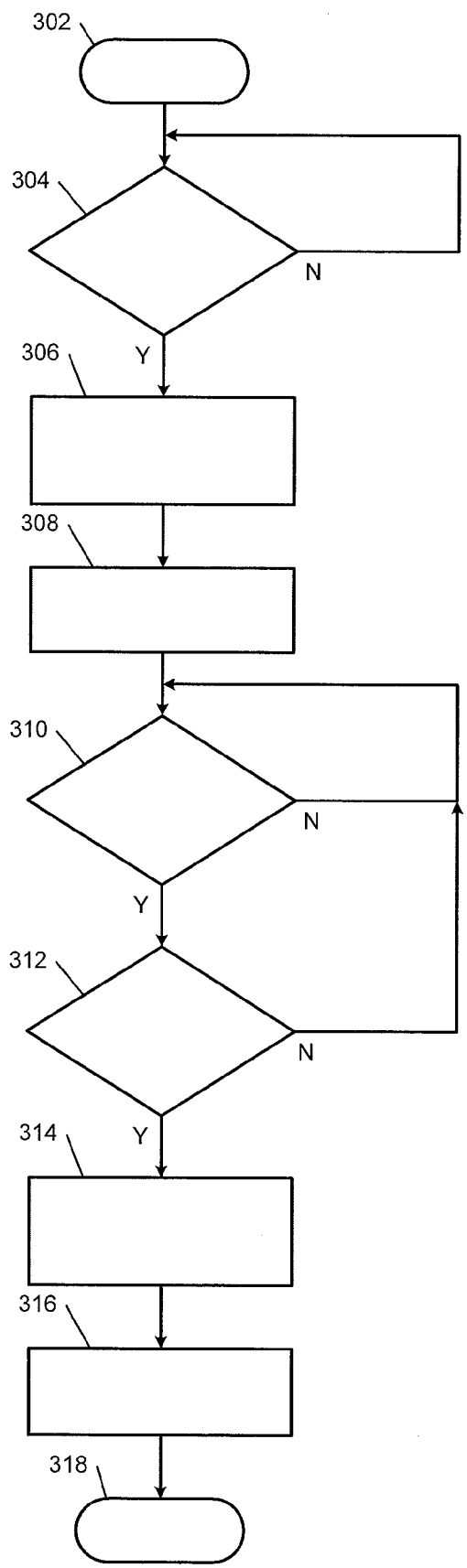
FIG. 3 is a flowchart illustrating an example control method according to the principles of the present disclosure.

Referring now to FIG. 3, an example method for clearing a readiness bit when a control module of a vehicle is reprogrammed begins at 302. The method is described in the context of the modules included in the example implementations of the ECM 110 and the TCM 112 shown in FIG. 2. However, the particular modules that perform the steps of the method may be different than the modules mentioned below and/or the method may be implemented apart from the modules of FIG. 2.

At 304, the reprogramming identification module 202 determines whether the ECM 110 has been reprogrammed. If the ECM has been reprogrammed, the method continues at 306. Otherwise, method remains at 304.

At 306, the diagnostic module 204 sets the first DTC. As discussed above, the first DTC may indicate that the ECM 110 has been reprogrammed and/or that a code clear is required, and the first DTC may include a pending DTC, a confirmed DTC, and a permanent DTC. Thus, setting the first DTC may include storing a pending DTC, a confirmed DTC, and a permanent DTC that all indicate the same message.

At 308, the diagnostic module 204 activates the service indicator 120. As noted above, when the service indicator 120 is activated by the diagnostic module 204, the service indicator 120 may indicate that the ECM 110 has been reprogrammed and/or that a code clear is required. At 310, the diagnostic module 204 determines whether the code clear instruction is received. As discussed above, the code clear instruction may be an instruction to clear the second DTC stored in the TCM 112, an instruction to clear all DTCs stored in the TCM 112, and/or an instruction to clear all DTCs stored in all control modules of the vehicle system 100. If the code clear instruction is received, the method continues at 312. Otherwise, the method remains at 310.

At 312, the diagnostic module 304 determines whether the conditions required for clearing codes have been satisfied. For example, as indicated above, the conditions required for clearing codes may be satisfied when an ignition switch of the vehicle system 100 is switched to an on position and/or when the engine 102 is not running. If the conditions required for clearing codes are satisfied, the method continues at 314. Otherwise, the method continues at 310.

At 314, the diagnostic module 304 clears the first DTC. In addition, the diagnostic module 304 may clear all pending, confirmed, and permanent DTCs stored in the ECM 110. Further, the TCM 112 may clear all pending, confirmed, and permanent DTCs stored in the TCM 112 and clear all readiness bits stored in the TCM 112. At 316, the diagnostic module 204 deactivates the service indicator 120. When deactivated, the service indicator 120 may no longer indicate that the ECM 110 has been reprogrammed and/or that a code clear is required.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
    a first reprogramming identification module that identifies when a first control module of a vehicle is reprogrammed; and
    a first diagnostic module that:
        sets a first diagnostic trouble code (DTC) when the first control module is reprogrammed; and
        selectively clears the first DTC in response to receiving an instruction to clear a second DTC stored in a second control module of the vehicle.

2. The system of claim 1 wherein the first diagnostic module stores the first DTC in the first control module after the first control module is reprogrammed.

3. The system of claim 1 wherein the first diagnostic module clears the first DTC when the instruction to clear the second DTC is received and engine operating conditions satisfy predetermined criteria.

4. The system of claim 1 wherein the first diagnostic module activates a service indicator when the first control module is reprogrammed.

5. The system of claim 4 wherein the first diagnostic module deactivates the service indicator when the first DTC is cleared.

6. The system of claim 1 wherein the first diagnostic module clears the first DTC when an instruction to clear all DTCs stored in the second control module is received.

7. The system of claim 6 further comprising the first control module, wherein the first control module includes the first reprogramming identification module and the first diagnostic module.

8. The system of claim 7 further comprising the second control module, wherein the second control module:
clears all DTCs stored in the second control module when the instruction to clear all DTCs stored in the second control module is received; and
clears all readiness bits in the second control module when clearing all DTCs stored in the second control module, wherein the readiness bits indicate whether a vehicle diagnostic test has been performed.

9. The system of claim 8 wherein the second control module includes:
a second reprogramming identification module that identifies when the second control module is reprogrammed; and
a second diagnostic module that:
sets a third DTC when the second control module is reprogrammed; and
selectively clears the third DTC when an instruction to clear DTCs stored in the first control module is received.

10. The system of claim 1 wherein the first diagnostic module clears the first DTC when an instruction to clear all DTCs stored in any control module of the vehicle is received.

11. The system of claim 1 wherein the first diagnostic module sets the first DTC when the first control module is reprogrammed by a device other than the first control module.

12. The system of claim 1 wherein the first diagnostic module sets the first DTC when the first control module is reflashed.

13. A method comprising:
identifying when a first control module of a vehicle is reprogrammed;
setting a first diagnostic trouble code (DTC) when the first control module is reprogrammed; and
selectively clearing the first DTC in response to receiving an instruction to clear a second DTC stored in a second control module of the vehicle.

14. The method of claim 13 further comprising storing the first DTC in the first control module after the first control module is reprogrammed.

15. The method of claim 13 further comprising clearing the first DTC when the instruction to clear the second DTC is received and engine operating conditions satisfy predetermined criteria.

16. The method of claim 13 further comprising activating a service indicator when the first control module is reprogrammed.

17. The method of claim 16 further comprising deactivating the service indicator when the first DTC is cleared.

18. The method of claim 13 further comprising clearing the first DTC when an instruction to clear all DTCs stored in the second control module is received.

19. The method of claim 18 further comprising:
clearing all DTCs stored in the second control module when the instruction to clear all DTCs stored in the second control module is received; and
clearing all readiness bits in the second control module when clearing all DTCs stored in the second control module, wherein the readiness bits indicate whether a vehicle diagnostic test has been performed.

20. The method of claim 19 further comprising:
identifying when the second control module is reprogrammed;
setting a third DTC when the second control module is reprogrammed; and
selectively clearing the third DTC when an instruction to clear DTCs stored in the first control module is received.

21. The method of claim 13 further comprising clearing the first DTC when an instruction to clear all DTCs stored in any control module of the vehicle is received.

22. The method of claim 13 further comprising setting the first DTC when the first control module is reprogrammed by a device other than the first control module.

23. The method of claim 13 further comprising setting the first DTC when the first control module is reflashed.

* * * * *